Jan. 21, 1964  F. S. MARKEY  3,118,646
PILOT OPERATED VALVE
Filed Jan. 9, 1961  2 Sheets-Sheet 1
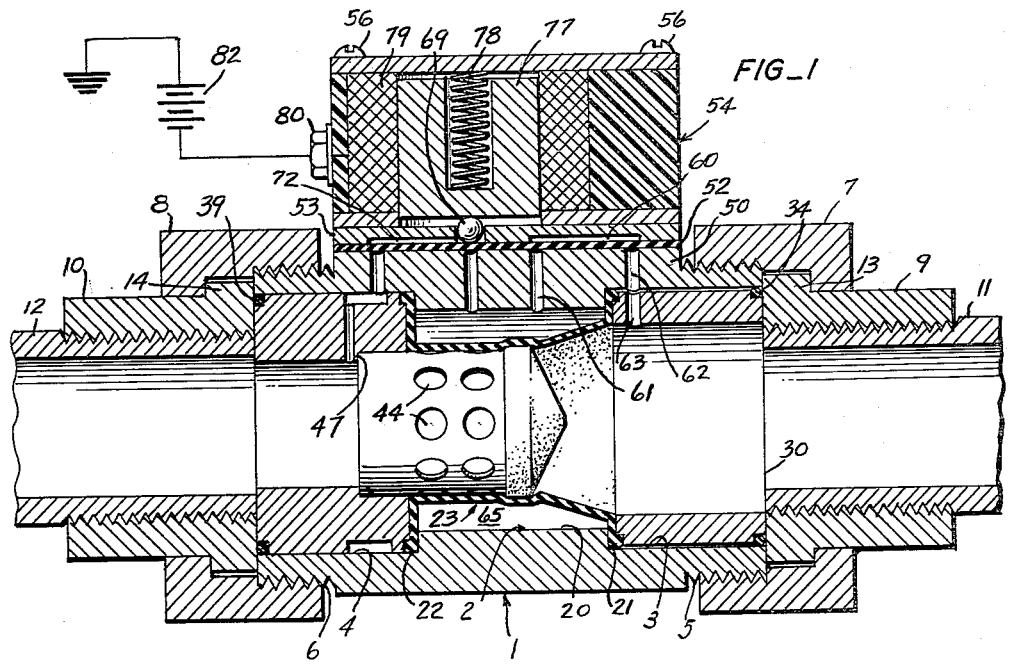
FIG_1
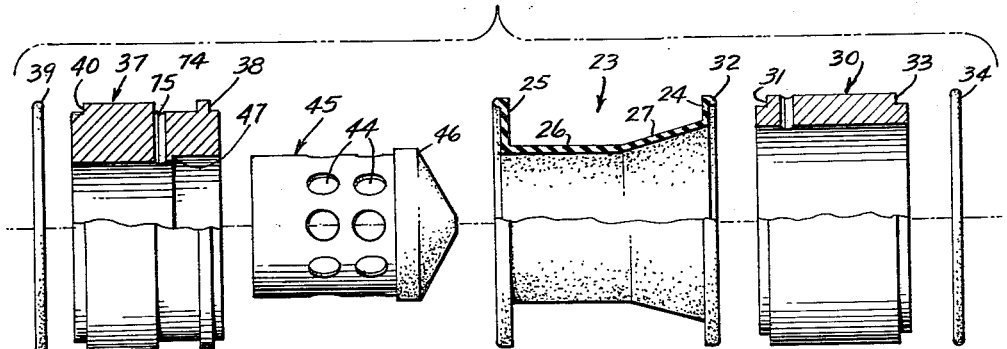
FIG_2
FIG_3
INVENTOR.
FRED S. MARKEY
BY
Berryken, Hobler + Wood
ATTORNEYS Jan. 21, 1964     F. S. MARKEY     3,118,646
PILOT OPERATED VALVE
Filed Jan. 9, 1961     2 Sheets-Sheet 2
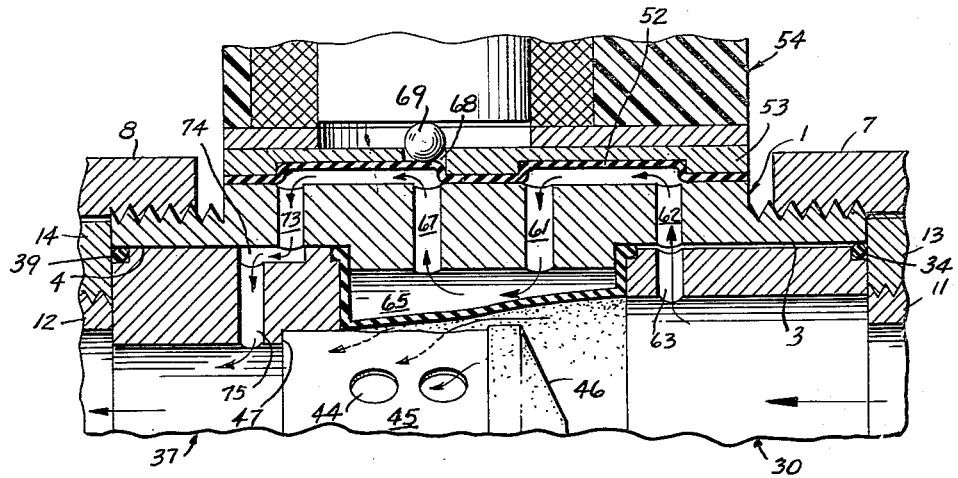
FIG_4
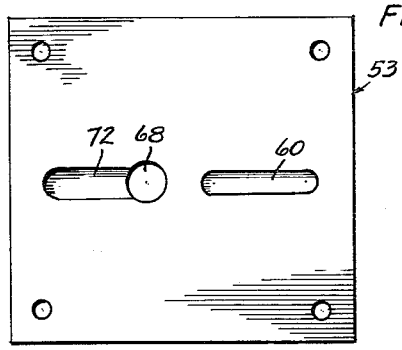
FIG_5
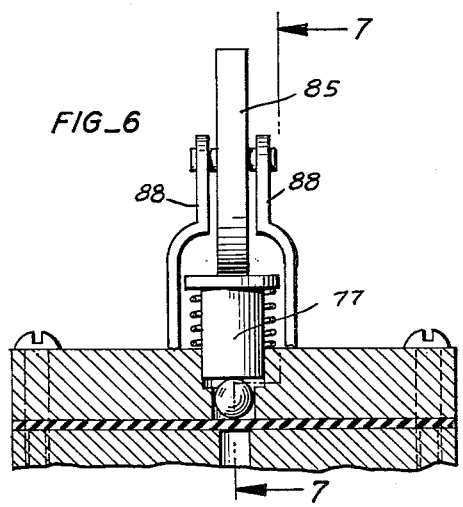
FIG_6
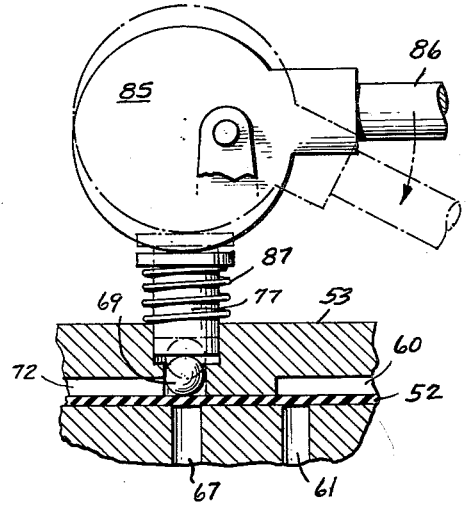
FIG_7
INVENTOR.
FRED S. MARKEY
BY
Boyken, Mohler, & Wood.
ATTORNEYS United States Patent Office 3,118,646
Patented Jan. 21, 1964

3,118,646
PILOT OPERATED VALVE
Fred S. Markey, Lafayette, Calif., assignor to Dura-Bond Bearing Company, Palo Alto, Calif.
Filed Jan. 9, 1961, Ser. No. 81,353
2 Claims. (Cl. 251—5)

This invention relates to a low energy shut-off valve. More particularly the invention relates to a valve adapted to control the flow of fluid in a conduit, and which valve requires a relatively small amount of energy compared to the amount of energy that would normally be required in a conventional valve to stop the flow of fluid in such conduit.

The main object of this invention is therefore the provision of a low energy shut-off valve requiring a relatively small amount of energy to actuate the same.

Another object of the invention is the provision of a valve which is opened and closed in such a manner as to minimize inertial effects such as are present in water hammer.

Still another object of the invention is the provision of a low energy valve which may be adapted for use with relatively large conduits and which may be solenoid actuated by a low voltage circuit.

Yet another object of the invention is the provision of a low energy valve which may be made relatively inexpensively.

Other objects and advantages will be apparent from the following specification and from the drawings.

FIG. 1 is a longitudinal section through the preferred embodiment of the valve.

FIG. 2 is an exploded view of some of the parts of the valve.

FIG. 3 is a top plan view of the valve body showing the arrangement of the pilot passageways therein.

FIG. 4 is a greatly enlarged fragmentary longitudinal section through valve body showing the manner in which the fluid flows through the pilot passageways.

FIG. 5 is a plan view of the underside of the pressure plate.

FIG. 6 is a fragmentary view similar to FIG. 1 showing a modified form of the invention in which the valve is actuated mechanically.

FIG. 7 is a view at right angles to FIG. 6.

In detail, and with reference first to FIG. 1, the invention comprises a valve body generally designated 1. The body is provided with a main passageway generally designated 2 and including an inlet end 3 and an outlet end 4. Said body is formed at said inlet and outlet ends with cylindrical extensions which are provided with external screw threads 5, 6 respectively for receiving clamping collars 7, 8. Although the manner in which the valve is secured to the conduit in which it functions is not critical, the structure of FIG. 1 includes internally threaded connector elements 9, 10 which respectively engage the inlet and outlet ends of the valve body and which receive inlet and outlet conduits 11, 12. Connector elements 9, 10 are formed with radially outwardly extending annular flanges 13, 14 for so engaging the adjacent ends of the valve body.

The inlet and outlet ends 3, 4 of the main passageway 2 are enlarged in diameter relative to the central portion 20 to provide annular shoulders 21, 22 respectively. Said shoulders serve to position a hollow spool generally designated 23 (FIG. 2). Spool 23 is made of yieldable material such as rubber and is formed at its ends to provide a pair of flanges 24, 25 which fit against shoulders 21, 22 respectively in main passageway 2. The sidewalls of spool 23 between said flanges 24, 25 are formed to provide a cylindrical portion 26 and a frusto-conical portion 27 which flares outwardly toward the inlet end 3 of main passageway 2. Said sidewalls are relatively thin so as to permit radial expansion and contraction in a manner that will be described later on in more detail.

A fluid tight connection is obtained between flange 24 and the inner sidewalls of passageway 2 by means of a retainer sleeve generally designated 30 (FIG. 2). Said sleeve is formed at one end with a shoulder 31 and flange 24 is complementarily formed as at 32 (FIG. 2) to obtain a tight fit. The opposite end of sleeve 30 is provided with a similar shoulder 33 which forms a seat for an annular packing element, such as an O-ring 34. When clamping collar 7 is tightened it brings flange 13 of connector element 9 into face to face engagement with O-ring 34 and the adjacent end of sleeve 30 thereby urging the latter axially into the main passageway and clamping the flange 24 of spool 23 between said sleeve 30 and shoulder 21 of passageway 2. This results in an effective fluid tight connection between flange 24 of the spool and the inner sidewalls of the main passageway.

A somewhat similar means is employed to seal flange 25 of spool 23 against the walls of passageway 2. Such means includes a retainer sleeve 37 which is provided with shoulder 38, similar to shoulder 31 of sleeve 30, for engaging the complementarily formed flange 25 of spool 23. An O-ring 39 is seated on a shoulder 40 as in the structure at the inlet end.

Received within the spool 23 is a sleeve generally designated 45 (FIG. 2) which is provided with a plurality of holes 44 on its sidewalls to permit fluid to pass radially therethrough. At one end of sleeve 45 the same is provided with an imperforate head 46 of rubber or the like which may be press fitted within said sleeve 45. It will be apparent from FIG. 1 that sleeve 45 with head 46 thereon may be inserted into spool 23 from the inlet end 3 of the main passageway. To insure the proper axial position of said sleeve 45 the retainer sleeve 37 at the outlet end may be formed with a shoulder 47 against which the adjacent end of sleeve 45 abuts. It will also be noted that, when properly positioned, the head 46 of sleeve 45 just fits within the end of cylindrical portion 26 of spool 23 that is adjacent the frusto-conical portion 27.

At this point it may be noted that fluid under pressure from the inlet end of the valve and applied against frusto-conical portion 27 of spool 23 may deflect the relatively thin sidewalls of said spool radially outwardly thereby forming an annular passageway between the obstruction formed by head 46 and the sidewalls of said spool. Fluid passing through said annular passageway will then be directed through holes 44 in sleeve 45 and into the outlet end of the valve. Such is the operation of the valve when it is open. See FIG. 4.

The valve is closed by applying pressure on the outer sides of the sidewalls of spool 23 so as to urge the same radially inwardly against head 46 and sleeve 45 thereby closing the annular passageway. The means for applying such pressure to the spool will now be described.

The body 1 of the valve is formed to provide an upwardly directed rectangular boss 50 which terminates in a rectangular planar surface 51 (FIG. 3). Covering said surface 51 is a rectangular gasket 52 of relatively thin flexible imperforate material such as rubber. Over the gasket 52 is positioned a relatively heavy rectangular pressure plate 53 and on top of plate 53 is a rectangular housing generally designated 54 which serves to contain a solenoid for actuating the valve. Said solenoid will subsequently be described but at this point it will be noted that the same is tightly secured to boss 50 by means of screws 56 which extend downwardly through housing 54, pressure plate 53 and gasket 52 into threaded holes 57 (FIG. 3) in boss 50. When screws 56 are tightened it will also be noted gasket 52 is tightly clamped between the upper surface 51 of boss 50 and pressure plate 53.

Referring now to FIG. 5 it is seen that the underside of pressure plate 53 is provided with a relatively shallow groove 60 into which the gasket 52 may be deflected. One end of groove 60 extends over a relatively small pilot hole 61 which in turn extends from the central portion 20 of the main passageway 2 through the boss 50 and terminates in the planar surface 51. The opposite end of groove 60 extends over a relatively small hole 62 which communicates between the inlet end 3 of main passageway 2 and the surface 51.

Fluid from the inlet pipe 11 is permitted to enter hole 62 through a small hole 63 (FIG. 2) in sleeve 30. The exact location of hole 63 in sleeve 30 is not critical since sleeve 30 preferably is loosely fitted within the inlet end 3 of the main passageway so that sufficient clearance between said sleeve and passageway exists to permit passage of fluid therearound.

By the above-described structure it will be apparent that fluid under pressure from the inlet end of the valve is permitted to pass through pilot hole 63 in sleeve 30, pilot hole 62 in body 1 and between gasket 52 and surface 51 of the boss 50 into pilot hole 61 so that the pressure of said fluid is applied to the annular space 65 surrounding the spool 23. It will be understood that the groove 60 (FIG. 5) in pressure plate 53 permits gasket 52 to deflect upwardly away from surface 51 thereby creating clearance for the fluid to enter the annular space 65 through pilot hole 61. It should also be noted that the above-described pilot holes are relatively small since it is desirable that only a small quantity of fluid be employed to actuate the valve and also because a slight delay during closing movement of the valve is desirable to prevent water hammer.

For the purpose of permitting fluid to escape from the annular space 65 a discharge hole 67 is provided in body 1 adjacent hole 61. In registration with the outlet of hole 67 on surface 51 a relatively large hole 68 is provided in pressure plate 53 and a spherical ball 69 is contained in said hole 68. The diameter of ball 69 is somewhat greater than the thickness of plate 53 so that pressure applied to the upper side of ball 69 is applied directly to the portion of gasket 52 that overlies the end of hole 67. In this manner flow of fluid from annular space 65 through hole 67 may be prevented by downward pressure on ball 69.

A groove 72 is provided in plate 53 (FIG. 5) so that communication is effected between discharge hole 67 and another hole 73 drilled from surface 51 into the outlet end 4 of the main passageway. Hole 73 communicates with an annular groove 74 formed in the periphery of the sleeve 37 and fluid entering said annular groove 74 is discharged into the valve outlet through a hole 75 drilled through sleeve 37 (FIG. 2).

It will be noted that the holes defining the passageway that conducts fluid from the annular space 65 around spool 23 to the discharge side of the valve are larger in cross sectional extent than the holes through which the fluid flows from the inlet end of the valve to the annular space 65. The reason for this is that a relatively quick opening of the valve is desirable whereas it is preferable to close the valve somewhat slower to prevent water hammer.

By the above-described structure it will be apparent that when ball 69 urges gasket 52 against the outlet end of pilot hole 67 no fluid can escape from annular space 65 and the inlet pressure is directed against the outer side of the spool sidewalls thereby closing the annular passageway between the central obstruction formed by head 46 and the sidewalls of spool 23 thereby closing the valve to flow of fluid from the inlet end to the outlet end. In other words when ball 69 is urged downwardly toward pilot hole 67 the valve is closed. When the ball 69 is free to move the pressure in annular spaces 65 is relieved through pilot holes 67 and 73 with communication between said holes being provided between gasket 52 and the upper planar face 51 of valve body 1. Said gasket being deflected upwardly into the space provided by groove 72.

The ball 69 may be actuated in various ways. Solenoid means for remote actuation is shown in FIG. 1 wherein a solenoid plunger 77 is urged downwardly against ball 69 by a helical spring 78. Surrounding plunger 77 and forming a central bore for reciprocably receiving said plunger is a solenoid coil 79 which may be grounded at one end to the valve body 1 and connected at its other end to a terminal 80. The coil 79 may be conveniently encased in insulating plastic to constitute the solenoid housing 54 hereinbefore referred to. If desired, reinforcing posts 81 may be placed at each corner of the housing to resist the compressive stresses resulting from tightening the bolts 56 on valve body 1.

It will be apparent that the above-described solenoid may be made extremely small and a relatively small voltage is sufficient to actuate the same. For example, a 6-volt battery 82, such as is used in a doorbell circuit, may be employed as indicated in FIG. 1 to energize the solenoid and open the valve.

It has been found that the valve above described is particularly suitable for remotely controlling sprinkler heads for residential use. It will be apparent that as the size of the valve is increased, it is not necessary to increase the size of the solenoid, nor is it necessary to increase the power required because only the flow through the pilot passageways is controlled and not the entire flow through the valve.

The control ball 69 may obviously be operated mechanically if desired. For example, as indicated in FIGS. 6, 7, a rotatably supported cam 85 may engage plunger 77 which in turn engages ball 69. Referring to FIG. 7 it is seen that rotation of cam 85 in a counterclockwise direction will urge ball 69 downwardly to close the valve while clockwise rotation of cam 85 will relieve the pressure on ball 69 and permit the valve to open. A spring 87 is employed to urge the plunger 77 upwardly when cam 85 is turned in a clockwise direction to open the valve, and a pair of bars 88 may be secured to pressure plate 53 to provide a mount for pivot pin 89 which supports cam 85.

One example of use of the mechanical embodiment would be in a toilet bowl in which case cam 85 may be actuated by a ball float arm 86.

It has been found that the above-described valve is extremely inexpensive to make because of the simplicity of the parts required. Furthermore all parts lend themselves to mass production.

The particular preferred embodiments of the invention above described should not be taken to be restrictive of the invention as it will be apparent that various modifications in design may be resorted to without departing from the invention as defined in the following claims. For example, a doorbell transformer may be employed in lieu of battery 82 to convert household alternating current to low voltage direct current.

I claim:
1. A pilot operated valve comprising:
  a valve body provided with a main passageway having an inlet end and an outlet end,
  a pressure responsive member having expansible chamber means responsive to pressure conditions in said inlet and outlet ends for actuating said member to open and close said main passageway,
  a first pilot passageway formed in said body and communicating between said inlet end and said chamber,
  a second pilot passageway formed in said body communicating between said chamber and said outlet end,
  a portion of each of said pilot passageways being defined by a surface on said valve body and a gasket overlying said surface, a pressure plate on said gasket for urging the latter into sealing engagement with said surface, groove means formed on the face of said pressure plate that is in engagement with said gasket to permit said gasket to deflect away from said surface under pressure of the fluid in the pilot passageways and into said groove means to thereby establish said pilot passageways, and a pilot valve element adapted to urge said gasket into engagement with said surface for preventing flow through said second pilot passageways to apply the pressure of fluid from said inlet end to said chamber thereby actuating said member to a position closing said passageway.

2. A valve structure according to claim 1 wherein said pilot passageways include bores extending generally perpendicular to said surface and communicating with said inlet and outlet ends and said chamber.

References Cited in the file of this patent
UNITED STATES PATENTS

| | | |
|---|---|---|
| 2,476,310 | Langdon | July 19, 1949 |
| 2,619,986 | Goepfrich | Dec. 2, 1952 |
| 2,786,642 | Comb | Mar. 26, 1957 |
| 2,821,355 | Hicks | Jan. 28, 1958 |
| 3,077,766 | Reinecke | Feb. 19, 1963 |

FOREIGN PATENTS

| | | |
|---|---|---|
| 132,806 | Australia | of 1949 |
| 656,585 | Great Britain | of 1951 |